United States Patent [19]

Nohtomi et al.

[11] 4,061,707

[45] Dec. 6, 1977

[54] PROCESS AND APPARATUS FOR HEAT SETTING BIAXIALLY ORIENTED TUBULAR POLYETHYLENE TEREPHTHALATE FILMS

[75] Inventors: Ryota Nohtomi; Masayoshi Sugiyama; Tuyoshi Shigeyoshi, all of Fuji, Japan

[73] Assignee: Minnesota Mining and Manufacturing Company, St. Paul, Minn.

[21] Appl. No.: 619,818

[22] Filed: Oct. 6, 1975

[30] Foreign Application Priority Data

Oct. 8, 1974 Japan .................... 49-115198

[51] Int. Cl.$^2$ ............................................. B29C 25/00
[52] U.S. Cl. .................... 264/95; 264/210 R; 264/290 R; 264/342 R; 264/342 RE; 425/445
[58] Field of Search ............ 264/95, 210 R, 235, 264/289 R, 290 R, 89, 342 R, 342 RE; 425/445

[56] References Cited

U.S. PATENT DOCUMENTS

| 2,916,764 | 12/1959 | Gerber | 264/95 |
|---|---|---|---|
| 3,257,489 | 6/1966 | Heffelfinger | 264/235 |
| 3,296,352 | 1/1967 | Riggs | 264/95 |
| 3,548,042 | 12/1970 | Hinrichs | 264/89 |
| 3,595,836 | 7/1971 | Korneli et al. | 264/235 |
| 3,788,503 | 1/1974 | Hirose et al. | 264/210 R |
| 3,814,785 | 6/1974 | Reade | 264/95 |

FOREIGN PATENT DOCUMENTS 68-12038  3/1968  Japan ...................... 264/95

Primary Examiner—Jeffery R. Thurlow
Attorney, Agent, or Firm—Cruzan Alexander; Donald M. Sell; James V. Lilly

[57] ABSTRACT

A process for continuously heat setting a tubular film of biaxially oriented polyethylene terephthalate in a state expanded with a gaseous material and taking the heat set film up on a winder which comprises carrying out the heat setting in a heat setting chamber wherein the temperature is controlled so as to be initially in the range of about 220° C.–240° C. in the first zone of heat setting and thereafter declines to about 195° C.–215° C. in the final zone while the length of the film is increased about 2% – 7% and the diameter of the film is reduced about 5 – 15% from the corresponding dimensions of the film before heat setting, the film then being taken up by a rotary winder. An apparatus for carrying out the described process is also provided which comprises a heating chamber having heating means dividing the chamber into zones so as to supply a hot blast in each zone of a different temperature from the other zones and rotatable means for controlling the stretch and shrinkage of the tubular film in the heating chamber and handling the film after it leaves the chamber comprising adjustable pinch rolls, film collapsing means and a winder, all mounted in fixed relation to one another.

5 Claims, 2 Drawing Figures

PROCESS AND APPARATUS FOR HEAT SETTING BIAXIALLY ORIENTED TUBULAR POLYETHYLENE TEREPHTHALATE FILMS

BACKGROUND OF THE INVENTION

The present invention relates to a process and an apparatus for producing heat set polyester films in an advantageous manner from a biaxially oriented tubular polyethylene terephthalate film.

It is necessary that packaging films have good dimensional stability. This dimensional stability is given to flat webs of biaxially oriented polyethylene terephthalate films by a heat setting process. Usually heat setting is carried out in a tenter stretching process wherein the film web is stretched and then heat set by hot air while being supported at its edges by means of clips of the tenter device used in the process.

On the other hand, in a tubular stretching process, heat setting by enclosing the air in the interior of a tubular film and expanding the resulting bubble by air pressure is known, as are heat setting by insertion of a mandrel in the interior of the film tube and sliding the tube over the mandrel, and heat setting a tubular film in a folded state in an oven after stretching.

In the process for heat setting a tubular film while expanding with internal air pressure, it is difficult to maintain the film bubble in a definite shape because the tubular film to be heat set is unsupported and a considerable film shrinkage stress occurs during heating; consequently it is difficult to carry out continuously stable heat setting of the films. There is the further problem in that physical properties which are uniform just after stretching are rather injured by the heat setting processing because of sway of the tubular film during heat setting.

Accordingly, heat setting of biaxially oriented tubular films has not been carried out advantageously industrially because of having the above described defects, even though the prior art of tubular heat setting is existent.

In Japanese Patent Publication No. 12,038/1968 there is disclosed a process which comprises heat setting a tubular film by heating means which are divided into multistage rooms along the running direction of the tubular film, wherein a suitable pressure is applied to each room, while an exterior pressure is applied to the tubular film so that the diameter of the tubular film after the heat processing means is smaller than a diameter of the stretched tubular film just prior to heat setting. However, this process is difficult to put in practical use because control of the pressure is complicated.

SUMMARY OF THE INVENTION

The present invention relates to a process for producing heat set tubular films having uniform physical properties, which films are unmarred by stripes caused by folding and which films have an excellent appearance.

The invention comprises a continuous process for heat setting of a tubular film of biaxially oriented polyethylene terephthalate in an expanded state by the use of gas pressure wherein the film is initially heated by a hot blast in the range of 220° C. - 240° C., which temperature is then gradually reduced until it it is in the range of about 195° C. - 215° C. During heating the diameter of the film tube is decreased in the range of about 5% - 15% while the film is stretched in the range of about 2% - 7% in the running direction of the film. The heat set film is then taken up by using a rotary winder which inhibits sway of the film during heat setting. An apparatus for producing the heat set tubular biaxially oriented film is also provided, which comprises a heating chamber having first and second pairs of nip rolls located respectively at the entrance to and exit from the heat setting chamber. Heating means are provided in the chamber to create a plurality of heating zones in the chamber for the tubular film bubble supported by and between said pairs of nip rolls, each heating means being capable of blowing a hot blast against the tubular film bubble in the heating chamber, the temperature of the heating units being independently adjustable; film collapsing means and winding means for simultaneously rotating in a fixed relationship to each other are provided at the film chamber outlet for winding the heat set tubular film.

DETAILED DESCRIPTION OF THE INVENTION

Figure 1:
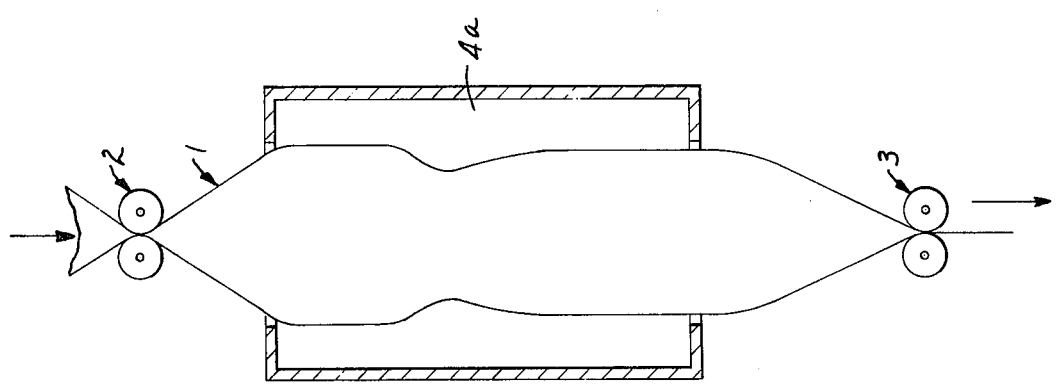
FIG. 1 is a plan of the heating chamber of the tubular heat setting process.

FIG. 1 is a section plan of the essential point of the process for carrying out tubular heat setting, wherein a biaxially oriented tubular film 1 is supported by a pair of nip rolls 2, the air is then enclosed in the film and the film is heated by introducing into heat setting chamber 4a. The film is then taken by another pair of nip rolls 3, and is collapsed and taken up on a winder. Though the tubular film supplied to the heat setting means rapidly shrinks with a shrinkage stress due to heating to reduce its diameter, the film gradually expands again as heat setting proceeds and the shrinkage stress decreases. The re-expansion finishes when the shrinkage stress disappears, and the film passes through the latter half part of the chamber at its final definite diameter to conclude the heat setting.

The heat setting temperature of a biaxially oriented polyethylene terephthalate film having a melting point of 265° C. is usually in a range of 180° - 240° C. If the heat setting is started at 180° C. and the temperature is gradually elevated and kept finally at 240° C., the tubular film exhibits a behavior wherein the diameter of the film becomes minimum at an inlet area of the heating zone of the heat setting means and then it gradually increases by expansion. However, a phenomenon of periodic sway occurs on the tubular film as it is being heat set. This sway occurs intermittently, and uniform heat setting cannot be carried out due to the film sway, which sway prevents the achievement of a definite uniform final film shape. Consequently, physical properties of the film products, such as the degree of shrinkage, deteriorate.

We have found that if the highest heating is achieved as the film is introduced into the heat setting chamber at the beginning of the heat setting cycle and the temperature is gradually reduced thereafter during the balance of the cycle, the diameter of the tubular film rapidly decreases with shrinkage as soon as the film is introduced into the heat setting means and thereafter gradually expands until the diameter reaches a definite value after the film passed through about ⅓ of the whole length of the chamber, with hardly any change in diameter thereafter. While the sway phenomenon still occurs, the interval between sway undulations increases and the degree of sway decreases sufficiently to provide better uniformity of physical properties in the final product.

In the case that the interior of the chamber is maintained at a definite temperature throughout its length, i.e., in the running direction of the tubular film, the film sway is so pronounced that uniform heat setting cannot be carried out.

It has been ascertained that the above described sway phenomenon during the heat setting depends upon not only a temperature of heating the film but is related to dimensional changes of the film. Thus, where the diameter of the tubular film after heat setting is equalized with the diameter thereof just after stretching and prior to heat setting, the sway of the film does not stop. As the result of studying dimensional changes in the longitudinal and transverse directions from the viewpoint of the sway, it has been found that smooth and uniform heat setting can be carried out continuously without generation of the sway and a residual shrinkage stress, if the film as it is being heat set is stretched about 2% – 7% and preferably about 2% – 4% in the running direction (machine direction) and shrunk about 5% – 15% and preferably about 10% – 15% in the diameter direction (transverse direction) while the temperature is gradually reduced from about 220° C. – 240° C. and preferably about 230° C. – 240° C. to about 195° C. – 215° C. and preferably about 195° C. – 205° C.

Control of dimensional changes, i.e., stretch and shrink, of the film bubble during heat setting is brought about initially by adjusting the air volume inside the tubular film at start up and thereafter by changing the angle of collapse of the bubble as it exits from the heat setting chamber, e.g., by moving the lower nip rolls toward or away from the chamber exit. Within the stretch and shrink limits sway is inhibited greatly and uniform product results even with the high temperatures used in heat setting. While little or no sway occurs at low heat setting temperatures, e.g. 180°–200° C., striping of the tubular film is not removed and the physical properties of the heat set film are impaired.

In carrying out biaxial stretching of the tubular film, a non-stretched tubular film is reheated between low speed nip rolls provided at the inlet of the stretching means and high speed nip rolls provided at the outlet while the film is expanded with an interior gas pressure.

Accordingly, since the low-speed and high-speed nip rolls nip the film with tolerably high pressure so as to prevent leakage of the interior gas pressure, the folds of the nonstretched film at passing through the low-speed nip rolls and the folds of the biaxially oriented film at passing through the high-speed nip rolls whiten in stripe-like due to stress crack. Still, there is the process which does not carry out nipping at the low-speed roll part. In this case, however, it is also inevitable that the folds at the high-speed nip roll part whiten.

In the case of taking up the tubular film as a tubular state or as two flat films by slitting both film edges, it has been known to carry out rotary winding by which unevenness of a film roll shape does not occur because of dispersion of uneven thickness of the film in the transverse direction of the final roll. Since the unevenness of film roll shape remarkably injures flatness of the film, it is not too much to say that the rotary winding is practically indispensable in the case of rigid films such as a biaxially oriented polyester film. However, it is not possible to produce the film roll which can be practically used, because the tubular film after biaxial stretching has stripes caused by folding as described above and the stripes always move from one film list (e.g., folded film edge) to the other list along the axis of the film roll at rotary winding when the stripes do not disappear during heat setting.

If the rotary winding is not carried out, the stripes caused by folding are always existent on both film lists (in the case of taking up as a tubular film). While they can be removed by slitting (in the case of taking up as two flat films after slitting both film lists), it is inevitable that the unevenness of film roll shape on the film roll will occur, evidencing a remarkable deterioration of flatness of the film roll.

Thus, experiments have made clear the importance of removing completely the stripes caused by folding on the film at the heat setting step in order to produce films having a good flatness. Therefore, it is indispensable to have a zone wherein the heating temperature is at least about 220° C. and preferably above about 230° C. in the heat setting section or chamber of the apparatus.

It is not necessary that the whole of the heat setting chamber through which the tubular film passes has a temperature above about 220° C. It is sufficient for stripe removal that the tubular film pass through such a high temperature zone for only a few seconds. It is preferred that only the first $\frac{1}{3}$ – 1/5 of the whole length of the heat setting chamber have a temperature above about 220° C. As noted previously, where the entire heat setting apparatus has a constant temperature above about 220° C., the sway of the film is remarkably enhanced.

The non-stretched film can be produced by the process which comprises extruding molten polyethylene terephthalate from an annular die and cooling directly by applying cold water on both surfaces of the film. Further, the biaxial stretching is carried out by the process which comprises expanding a tubular film by heating while enclosing the air in the interior of the film to stretch in the transverse direction and stretching at the same time in the longitudinal direction by a difference of speeds of the nip rolls located at the upper position and the lower position. (For example, biaxial stretching is carried out by the process described in U.S. Pat. No. 3,788,503).

In the following, the heat setting apparatus and the process for heat setting are illustrated with reference to FIG. 2.

As described above, a biaxially oriented tubular film 1 is introduced into a heat setting apparatus 4 through nip rolls 2. The film after heat setting by heating with hot air blasts blown from a holed plate 7 is collapsed and folded by collapsing frames or rolls 13, drawn by nip rolls 3 and taken up on a winder by a rotary winding means 10 to produce a finished product 11. The nip rolls 3 are movable upwards and downwards to control the final diameter of the tubular film in the heat setting apparatus. The heat setting apparatus 4 is equipped with air heating means comprising heaters 6 and fans 5 by which hot air blasts at the desired temperature are blown into the chamber 4a. Further, in this Figure, the apparatus is divided into four zones, wherein the temperature of each zone can be adjusted independently with the air heating means for that zone. Each zone is equipped with an exhaust system by which the influence of the hot blast of each zone upon the other zones is minimized. In order to carry out uniform blowing of the hot blasts, the holed plate 7 is located parallel to or concentric with the film surface. Hot blast suction nozzles 8 and 8' at the heating chamber 4a inlet and outlet respectively provide an air curtain so that exterior air streams do not flow into the heat setting chamber 4a of the apparatus 4. Cooling ring 9 beneath the nozzles 8 provide means for cooling the heat set film. Collapser 13, nip rolls 3 and a winder 14 are mounted on a turn table 12 and rotate or oscillate simultaneously therewith in a fixed relationship to each other. The rotary winder means or assembly 10 comprises the winder 14, guide rolls 15 and the turn table 12.

The biaxially oriented film 1 is heated in the first zone of the heat setting apparatus 4 with, for example, a hot blast of 240° C., heated in the second, third and blast zones with hot blasts each having a lower temperature than the one preceding it, the fourth zone having, for example, a hot blast of 200° C.

The above described temperature of the hot blasts means an average temperature of the hot blast in each zone. But it is preferred that the distribution of the temperature range in each zone be as narrow as possible. Though hot blasts are used for heating the film, they may be combined with infrared ray heaters, if desired.

In carrying out heat setting, the revolving rate of the nip rolls 3 is about 2% – 7% higher than that of the nip rolls 2. At the same time, the diameter of the film at the outlet part of the heat setting apparatus is reduced about 5% – 15% smaller than that of the film at the inlet part by adjusting the vertical position of the nip rolls 3.

Though it is possible to oscillate the rotary winder 10, it is preferred to rotate it in a definite direction. The rotation cycle depends on the speed of the running film and generally is about 20 minutes. The heat set film is then taken up on the winder in a collapsed tubular state. However, if necessary, the film may be taken up on the winder respectively after slitting both film edges to make two sheets.

The heat setting apparatus may be a standing vertical type one as illustrated or it may be a horizontal type one. However, in the horizontal apparatus, the heating temperature for the film should vary only about 10° C. in the circumferential direction from inlet to outlet to bring about a uniform heat setting operation. Accordingly, the standing type apparatus is preferred since the film runs downwards and greater leeway is possible in temperature declination changes from the higher inlet temperature to the lower outlet temperature along the running direction of the film.

Thus, uniformly heat set polyethylene terephthalate biaxially oriented tubular film can be produced continuously and smoothly.

Though the heat setting chamber is divided into four zones in the above drawing, the number of zones is not limited to four. But at least two zones are necessary.

In the following, the present invention is illustrated in detail with reference to Examples.

EXAMPLE 1

Polyethylene terephthalate having a relative viscosity of 0.70 was melted at 287° C. by using an extruder and extruded from an annular die having a slit diameter of 75 mm. The extruded material was slid on a mandrel having a diameter of 66 mm. which was placed just below the die. Cooling water was maintained at 20° C. circulated inside the mandrel. At the same time the tube of film was cooled with cooling water in an external cooling bath at 20° C. to produce a non-stretched film tube having a diameter of 66 mm. and a thickness of 110 microns.

The film was then introduced into the stretching apparatus equipped with two pairs of nip rolls, and air was enclosed inside the film to expand in the diametric direction by an air pressure to make 200 mm. in the diameter. At the same time the film was stretched 3.0 times in the longitudinal direction by a difference of resolving rates of the nip rolls to carry out biaxial stretching.

Figure 2:
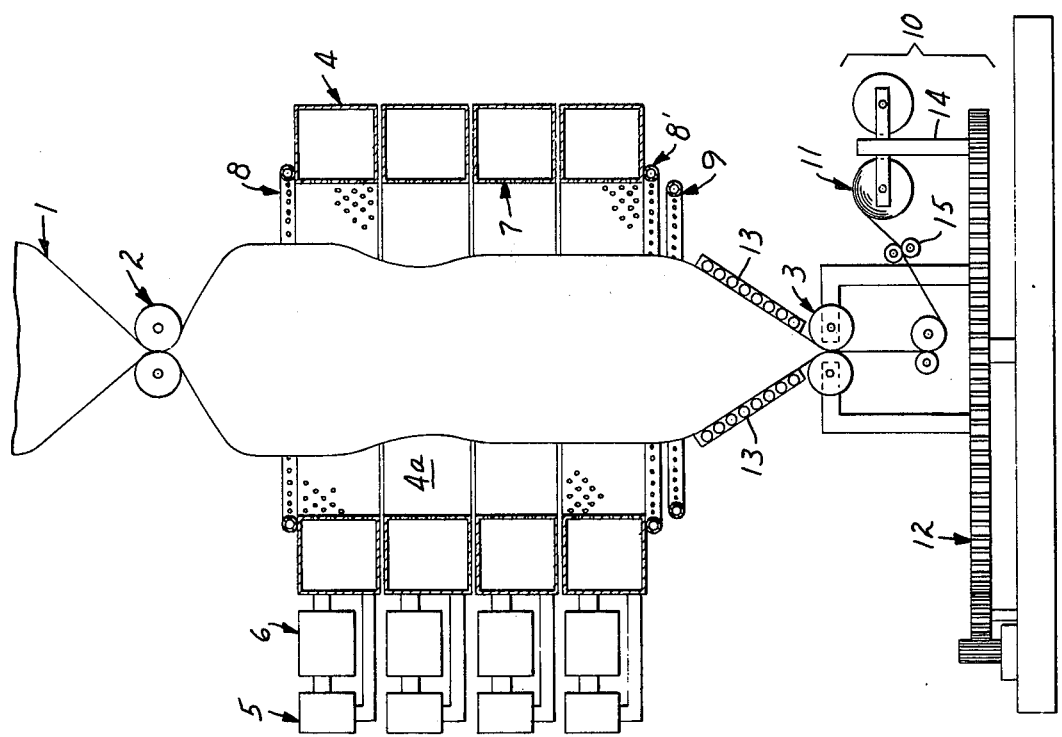
FIG. 2 is a diagram of the heat setting apparatus.

The resulting biaxially oriented film was introduced into the heat setting apparatus shown in FIG. 2 at a feed rate of 20 m./min. to carry out heat setting. In carrying out heat setting, the hot blast temperature was 240° C. in the first zone, 230° C. in the second zone, 215° C. in the third zone and 200° C. in the fourth zone and a blowing rate of the hot blasts was 12 m./min. This corresponds with a film heat transfer coefficient of about 50.

The diameter of the film tube was reduced during heat setting to 175 mm., which meant about 12.5% shrinkage in the transverse direction. The film take-up rate was 20.6 m./min., which was 3% faster than the feed rate of the film to the heat setting apparatus. The inside diameter of the heat setting apparatus used was 400 mm. and the length thereof was 3.5 m.

The shape of the film bubble was maintained in a definite state during heat setting and no sway of the bubble was observed. Further, it was possible to operate safely and continuously for about 8 hours.

The resulting tubular biaxially oriented polyethylene terephthalate film was 15.5 microns thick, had a haze reading of 1.75, a tensile strength in the longitudinal direction of 1,980 kg./cm.$^2$ and a tensile strength of 1,880 kg./cm.$^2$ in the transverse direction, which was nearly a 1 to 1 ratio.

The heat shrinkage of the heat set tubular film, measured after dipping the film in silicone oil for 10 seconds at 150° C., was 0.4% in the longitudinal direction and 0.7% in the transverse direction, showing a good dimensional stability.

The film taken up by the rotary winder had a uniform appearance, all stripes caused by folding of the non-stretched film having disappeared.

EXAMPLES 2 – 5

The same biaxially oriented film as in Example 1 was heat set under conditions shown in Table 1 by means of the same apparatus as shown in FIG. 2 or an apparatus wherein the heat setting chamber was divided in three or two stages. Physical properties of the heat set film are shown in Table 1.

The shape of the film bubble during heat setting was maintained in a definite state and no sway of the bubble was observed. Further, it was possible to operate safely and continuously for a long period of time.

Table 1

| Example No. | | 2 | 3 | 4 | 5 |
|---|---|---|---|---|---|
| Heat setting conditions | | | | | |
| Film feeding rate | m./min. | 20 | 15 | 15 | 18 |
| Film taking-up rate | m./min. | 21.4 | 15.4 | 15.9 | 18.7 |
| Percent stretching in longitudinal direction | % | 7 | 2.7 | 6 | 3.9 |
| Diameter of film before heat setting | mm. | 200 | 200 | 200 | 200 |
| Diameter of film after heat setting | mm. | 190 | 185 | 172 | 180 |
| Percent shrinkage in transverse direction | % | 5 | 7.5 | 14 | 10 |
| Number of hot blast zones | | 4 | 3 | 3 | 2 |
| Temperature of hot blast | | | | | |

Table 1-continued

| Example No. | | 2 | 3 | 4 | 5 |
|---|---|---|---|---|---|
| 1st zone | | 240 | 220 | 220 | 230 |
| 2nd zone | | 230 | 210 | 210 | 215 |
| 3rd zone | | 215 | 200 | 195 | — |
| 4th zone | | 200 | — | — | — |
| Properties of heat set film | | | | | |
| Thickness | micron | 14 | 15 | 15.5 | 15 |
| Haze | | 1.8 | 1.8 | 1.8 | 1.85 |
| Tensile strength | | | | | |
| Longitudinal direction | kg./cm.$^2$ | 2,000 | 1,950 | 1,970 | 1,950 |
| Transverse direction | kg./cm.$^2$ | 1,900 | 1,850 | 1,800 | 1,850 |
| Heat shrinkage | | | | | |
| Longitudinal direction | % | 0.5 | 0.6 | 0.7 | 0.6 |
| Transverse direction | % | 0.9 | 0.9 | 0.8 | 0.8 |

Table 2 following tabulates the results of a series of tubular film runs on the apparatus utilized in Examples 2 – 5 and is included for comparison purposes. The runs are numbered serially from 1 through 20.

Table 2

| | Heat Setting Conditions | | | | Dimensional change on film during heat setting | | Sway of film during heat setting (Note 1) | Stripes of film caused by folding (Note 2) | Heat Shrinkage Ratio of Heat Set Film (Note 3) | |
|---|---|---|---|---|---|---|---|---|---|---|
| | Temperature of hot blast | | | | Transverse direction | Longitudinal direction | | | Longitudinal direction | Transverse direction |
| No. | Zone 1 | Zone 2 | Zone 3 | Zone 4 | | | | | | |
| 1 | 180° C. | 180° C. | 180° C. | 180° C. | 0% | 0% | +++ | X | — % | — % |
| 2 | 180 | 180 | 180 | 180 | −14 | 4 | + | X | 14.3 | 16.9 |
| 3 | 200 | 200 | 200 | 200 | −15 | 2 | ++ | X | 3.4 | 4.4 |
| 4 | 240 | 240 | 240 | 240 | 0 | 0 | +++ | * | — | — |
| 5 | 250 | 250 | 250 | 250 | 0 | 0 | +++ | * | — | — |
| 6 | 180 | 200 | 230 | 250 | 0 | 0 | +++ | * | — | — |
| 7 | 250 | 230 | 200 | 180 | 0 | 0 | +++ | * | — | — |
| 8 | 220 | 210 | 200 | — | 0 | 0 | ++ | * | — | — |
| 9 | 195 | 220 | 220 | — | 0 | 0 | +++ | * | — | — |
| 10 | 240 | 230 | 215 | 200 | 0 | 0 | ++ | * | — | — |
| 11 | 225 | 215 | 200 | — | 0 | 0 | ++ | * | — | — |
| 12 | 240 | 240 | 240 | 240 | −12 | 2 | ++ | * | 8.7 | 11.2 |
| 13 | 230 | 230 | 230 | — | −12 | 3 | ++ | * | — | — |
| 14 | 240 | 230 | 215 | 200 | −11 | 0 | ++ | * | 0.5 | 0.8 |
| 15 | 240 | 230 | 215 | 200 | −20 | 0 | ++ | * | 0.4 | 0.5 |
| 16 | 240 | 230 | 215 | 200 | 0 | 3 | ++ | * | 1.1 | 0.9 |
| 17 | 240 | 230 | 215 | 200 | 0 | 9 | ++ | * | 2.2 | 1.5 |
| 18 | 240 | 230 | 215 | 200 | −3 | 3 | ++ | * | 0.5 | 0.9 |
| 19 | 240 | 230 | 215 | 200 | −10 | 10 | + | * | 1.1 | 0.8 |
| 20 | 240 | 230 | 215 | 200 | −25 | 3 | ++ | * | 0.4 | 0.5 |

Notes to Table 2
- (Note 1) The sway of film represents a degree of sway:
  - \+ Little
  - ++ Medium
  - +++ Much
- (Note 2) X: Stripes did not disappear
  - *: Stripes disappeared
- (Note 3) Heat shrinkage ratio after steeping in silicone oil at 150° C. for 10 seconds.

With respect to run 1, where the heat setting was carried out at 180° C. without any stretching (or shrinking) of the tubular film in any direction, considerable sway occurred and the stripes caused by folding at the nip rolls 2 did not disappear.

With respect to run 2, the film was stretched and shrunk during heat setting as in the present invention and the degree of sway decreased markedly, but the stripes caused by folding did not disappear.

With respect to run 3, the film was stretched and shrunk during heat setting as in the present invention but heat setting was carried out at a definite temperature of 200° C. and considerable sway occurred.

In runs 4 through 9 the film was passed through at least one heating zone of above 220° C. during heat setting but without stretching or shrinking and vigorous sway occurred. In run 5, the sway continued for 20 seconds.

In runs 8, 10 and 11 wherein the film was treated at the declining temperature ranges of the present invention but without stretching (or shrinking), the degree of sway decreased and the time of each sway was only about 4 seconds.

In runs 12 and 13 stretching or shrinking was carried out as in the present invention but at a fixed temperature above 220° C. (230° C. or 240° C.), the stripes caused by folding were not observed but considerable sway occurred.

In runs 14 – 20 where the film was heat set at the declining temperature ranges of the present invention but stretching and shrinking were carried out under conditions outside of the present invention, sway was not removed.

What we claim is:

1. In the process for producing polyethylene terephthalate film which comprises a step for heat setting a tubular biaxially oriented polyethylene terephthalate film by continuously heating a film bubble expanded by a gas pressure, the improvement comprising:
   a. heat setting said film in a chamber by blowing hot gaseous blasts against the exterior surface of said film bubble; wherein the temperature of the hot blasts is about 220° C.-240° C. along the first 1/5-⅓ of the chamber and wherein the temperature of the blasts thereafter declines to about 195° C.-215° C. at the final stage of heat setting, and
   b. reducing the diameter of the tubular film during heat setting by about 5%-15% of that before heat setting and stretching the length thereof by about 2%-7% of that before heating;
   wherein sway of the film is eliminated during heat setting.

2. In the process as set forth in claim 1, the tubular heat set film being taken up on a winder in a folded state while rotating said tubular film around the axis of the film.

3. In the process which comprises heat setting a tubular biaxially oriented polyethylene terephthalate film by continuously heating a film bubble expanded by a gas pressure, and taking up on a winder, the improvement comprising:

a. heat setting said film in a chamber by blowing hot gaseous blasts against the exterior surface of said film bubble; wherein the temperature of the hot blasts is about 220° C.-240° C, along the first 1/5-⅓ of the chamber and wherein the temperature of the blasts thereafter declines to about 195° C.-215° C. at the final stage of heat setting, and b. reducing the diameter of the tubular film during heat setting by about 5%-15% of that before heating and stretching the length thereof by about 2%-7% of that before heat setting; whereby sway of the film is eliminated during heat setting, and c. taking the tubular heat set film up on a winder in a folded state while rotating said tubular film around the axis of the film.

4. In the process for producing polyethylene terephthalate films which comprises a step for heating setting a tubular biaxially oriented polyethylene terephthalate film by continuously heating a film bubble expanded by a gas pressure, the improvement comprising:

a. heat setting said film in a chamber by blowing hot gaseous blasts against the exterior surface of said film bubble; wherein the temperature of the hot blasts is about 230° C.-240° C. along the first 1/5-⅓ of the chamber and wherein the temperature of the blasts thereafter declines to about 195° C.-205° C. at the final stage of heat setting, and b. reducing the diameter of the tubular film during heat setting by about 5%-15% of that before heating and stretching the length thereof by about 2%-7% of that before heat setting;

whereby sway of the film is eliminated during heat setting.

5. In the process which comprises heat setting a tubular biaxially oriented polyethylene terephthalate film by continuously heating a film bubble expanded by a gas pressure and taking up on a winder, the improvement comprising:

a. heat setting said film in a chamber by blowing hot gaseous blasts against the exterior surface of the film bubble; wherein the temperature of the hot blasts is about 230° C.-240° C. along the first 1/5-⅓ of the chamber and wherein the temperature of the blasts thereafter declines to about 195° C.-205° C. at the final stage of heat setting, and b. reducing the diameter of the tubular film during heat setting by about 5%-15% of that before heating and stretching the length thereof by about 2%-7% of that before heat setting;

whereby sway of the film is eliminated during heat setting.

* * * * *

UNITED STATES PATENT AND TRADEMARK OFFICE
CERTIFICATE OF CORRECTION

PATENT NO. : 4,061,707
DATED : December 6, 1977
INVENTOR(S) : Ryota Nohtomi; Masayoshi Sugiyama; Tuyoshi Shigeyoshi It is certified that error appears in the above-identified patent and that said Letters Patent are hereby corrected as shown below:

On the first page of the patent following the drawings, stated Assignee reads: "Minnesota Mining and Manufacturing Company, St. Paul, Minn."; but should read -- KOHJIN CO., LTD, Tokyo, Japan --.

Signed and Sealed this

Twentieth Day of June 1978

[SEAL]

Attest:

RUTH C. MASON
Attesting Officer

DONALD W. BANNER
Commissioner of Patents and Trademarks